No. 800,893. PATENTED OCT. 3, 1905.
G. A. BADER.
EYEGLASSES.
APPLICATION FILED JAN. 3, 1905.
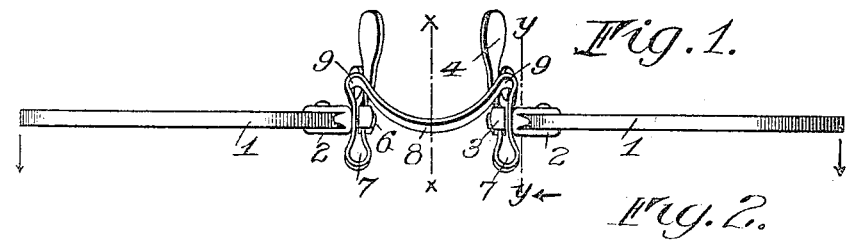
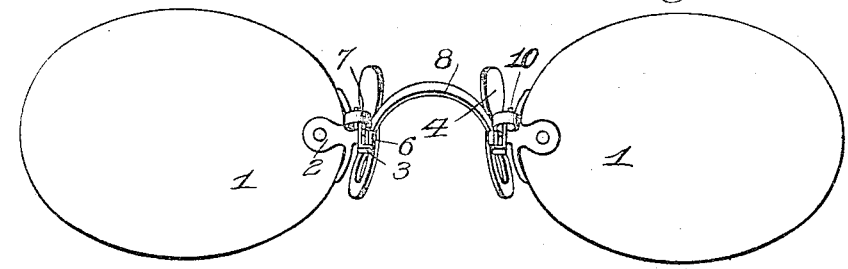
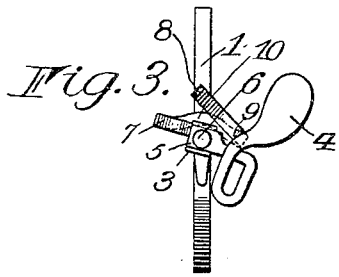
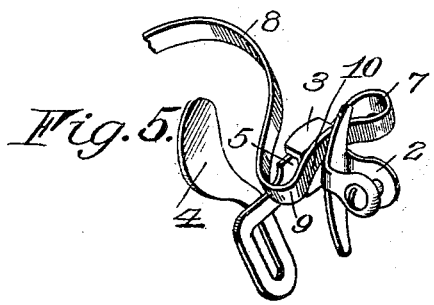
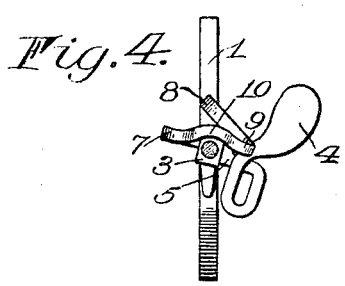
Witnesses
Walter B. Payne
G. Willard Rich
Inventor
Gustav A. Bader
By Frederick S. Church
Attorney

UNITED STATES PATENT OFFICE.

GUSTAV A. BADER, OF ROCHESTER, NEW YORK, ASSIGNOR TO E. KIRSTEIN SONS COMPANY, OF ROCHESTER, NEW YORK, A CORPORATION OF NEW YORK.

EYEGLASSES.

No. 800,893.   Specification of Letters Patent.   Patented Oct. 3, 1905.

Application filed January 3, 1905. Serial No. 239,341.

*To all whom it may concern:*

Be it known that I, GUSTAV A. BADER, of Rochester, in the county of Monroe and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and has for its object to provide an improved spring or spring-bridge particularly adapted for glasses, arranged to be opened for application to the wearer's nose by a movement of the lenses in a plane transversely of that of the surface of the latter and also particularly adapted for that form in which the arched portion of the bridge is arranged in contact with or in close proximity to the nose of the wearer.

The invention has for its further object to provide a spring which is relatively long between the points of attachment to the lenses and is bent or looped at two points in its length in such a way that when the guards are separated by moving the lenses and flexing the spring all of the loops will be closed or moved in a direction tending to close them, thereby increasing the life of the spring.

To these and other ends the invention consists in certain improvements and combinations of parts, all as will be hereinafter more fully described, the novel features being pointed out in the claims at the end of the specification.

In the accompanying drawings, Figure 1 is a plan view of a pair of eyeglasses provided with my improvements. Fig. 2 is a front view. Fig. 3 is a sectional view of the same on the line *x x* of Fig. 1. Fig. 4 is a sectional view on the line *y y* of Fig. 1 in the direction indicated by the arrow. Fig. 5 is a perspective view of one end of the spring and the attaching-plate and guard.

Similar reference-numerals in the several figures indicate similar parts.

The lenses (indicated by 1) and the attaching-clips (indicated by 2) are of the usual or any preferred construction; but in the present embodiment the said clips have their flanges 3 constituting the boxes for the spring and guards arranged at a slight angle relatively to the plane of the lenses.

4 indicates a nose-guard, which may be of the usual or any preferred construction, the shanks or attaching ends 5 thereof being secured, as usual, beneath the ends of the spring by the screws 6.

The spring forming the subject-matter of my invention is preferably composed of a single piece of flat resilient material having the attaching ends extending into the boxes from the front, preferably beneath the shanks of the guards, thence extending from said ends forwardly of the boxes and lenses, thence laterally and rearwardly forming loops 7, thence over the studs of the clips and rearwardly of the lenses, thence inwardly and forwardly toward the center, forming the bridge or arched portion 8, the bends between the ends of this arched portion and the rearwardly-extending parts of the spring forming loops 9, the open sides of which extend toward the front. The central or arched portion 8 of the spring may or may not be arranged at a slight angle, so that it will be located in close proximity to or in contact with the bridge of the wearer's nose, depending upon the facial characteristics of the wearer; but it is preferable that the forward portions of this arch do not extend forward of the plane of the front of the lenses, this arrangement causing the spring to resemble in appearance and function what is known as a "saddle-bridge."

It is preferable that the portion of the spring extending over the studs of the clips be arched slightly, as is shown at 10, in order that the two loops may be approximately in the same plane as the ends of the studs or clips, thereby bringing both loops and the studs practically in the same plane when viewed from the front, thus enhancing the appearance of the mounting.

In opening the glasses by the separation of the guards for application to the wearer's nose the outer ends of the lenses are moved forward, as usual, in this class of devices in the direction of the arrow *a*, in Fig. 1, and it will be noted that this operation causes the loops 7 and 9 of the spring to be closed, or their proximate sides to be brought together instead of being separated, this arrangement increasing the resiliency of the spring and lessening the tendency to cause it to become broken or its tension to be reduced by repeated operations.

The spring may well be formed of a single flat strip of spring metal, the ends of which are broadened and perforated for the application of the attaching parts.

I claim as my invention—

1. In eyeglasses, the combination with the lenses and the guards in rear thereof, of the spring connected to the lenses embodying the central portion and attaching ends, and two looped portions between each end and the central portion, said loops opening toward the front and rear respectively, and so arranged relatively to the guards that the separation of the guards will cause a movement of the sides of both loops toward each other.

2. In eyeglasses, the combination with the lenses and the guards in rear thereof, of the spring connecting the lenses embodying the central portion, attaching ends and two looped portions between each end and the central portion opening toward the front and rear respectively and arranged to close when the guards are separated, the rearwardly-opening loops being adjacent the lenses.

3. In eyeglasses, the combination with the lenses, the studs thereon and the guards in rear of the lenses, of the spring connected to the studs at its ends and extending thence forwardly, outwardly and rearwardly of the studs and thence inwardly and forwardly toward the central connecting portion, forming the two loops arranged to close when the guards are separated.

4. In eyeglasses, the combination with the lenses, the studs and the guards in rear of the lenses, of the spring embodying the central connecting portion and the two loops between the central portion and each of the attaching ends, one of each of said pair of loops being in front and the other in rear of its corresponding stud and in substantially the same horizontal plane.

5. A spring for eyeglasses consisting of a strip of resilient material having the attaching ends, the strip extending from each of said ends forwardly, outwardly, rearwardly past the ends, thence inwardly and upwardly forming the arched central connecting portion.

GUSTAV A. BADER.

Witnesses:
G. WILLARD RICH,
WALTER B. PAYNE.